June 13, 1961 L. H. SUTHERLAND ET AL 2,988,425
METHOD FOR SEPARATION OF ACIDS
Filed April 25, 1958
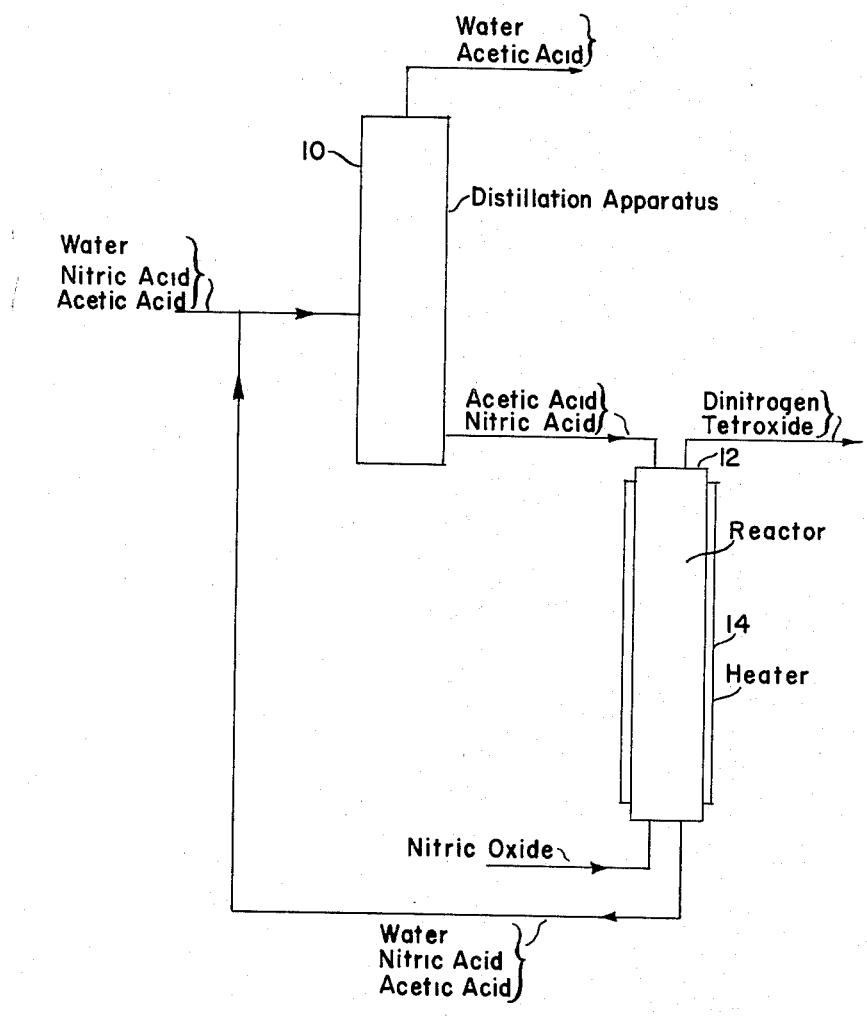
INVENTORS
Leslie H. Sutherland
Erwin F. Schoenbrunn
BY Oliver W. Hayes
Wilfred Baranek 2,988,425
Patented June 13, 1961

2,988,425
METHOD FOR SEPARATION OF ACIDS
Leslie H. Sutherland, Wellesley, and Erwin F. Schoenbrunn, Needham, Mass., assignors to Escambia Chemical Corporation, Pace, Fla., a corporation of Delaware
Filed Apr. 25, 1958, Ser. No. 731,021
10 Claims. (Cl. 23—157)

This invention relates to the production of chemicals and in particular to the separation of acids.

A principal object of the present invention is to provide a method for separating nitric acid and acetic acids from mixtures thereof and from each other.

Another object of the invention is to provide a method for separating nitric acid and acetic acid from aqueous mixtures thereof and from each other.

Other objects of the invention will in part be obvious and will in part appear hereinafter.

The invention accordingly comprises the method involving the several steps and the relation and the order of one or more of such steps with respect to each of the others, which are exemplified in the following detailed disclosure and the scope of the application of which will be indicated in the claims.

For a fuller understanding of the nature and objects of the invention reference should be had to the following detailed description taken in connection with the accompanying drawing which is a flow sheet illustrating one manner of practicing the present invention.

There are many processes known wherein there are obtained mixtures containing appreciable quantities of nitric acid and acetic acid or nitric acid, acetic acid and water. In order to utilize the individual acids it becomes necessary to separate them from each other. This separation was heretofore, difficult, inefficient and uneconomical due to the nature of the properties of the acids. For instance, nitric acid and acetic acid form a constant boiling mixture consisting of about 34 mole percent nitric acid and 66 mole percent acetic acid. This makes it impossible to separate the two acids in the mixture by straightforward distillation techniques. Separation of acetic acid from nitric acid by solvent extraction is also not promising because of the solubility of nitric acid in most suitable solvents. The present method provides for the separation of nitric acid and acetic acid from mixtures thereof in a manner having greater efficiency, economy and simplicity than previously proposed methods.

In the present invention there is provided a method for recovering nitrogen values from a mixture of nitric acid, acetic acid and water. This method comprises removing substantially all of the water from the mixture, treating the substantially anhydrous mixture of nitric and acetic acids with nitric oxide until a major portion of the nitric acid is reduced to dinitrogen tetroxide, and recovering the dinitrogen tetroxide.

One specific method of accomplishing the present invention comprises distilling a mixture of nitric acid and acetic acid to form a bottom fraction consisting essentially of a mixture of nitric acid and acetic acid and overhead fractions of any excess nitric and acetic acid and water. The overhead acids are recovered. The bottom fraction mixture of acids is treated with nitric oxide to convert the major portion of the nitric acid to dinitrogen tetroxide and water. The resultant dinitrogen tetroxide, water and acetic acid are then distilled and recovered. In one embodiment of the invention the bottom fraction approximates or is similar to the constant boiling mixture of nitric acid and acetic acid.

In another embodiment of the invention the mixture of nitric acid and acetic acid is treated with nitric oxide until about 75 percent of the nitric acid therein is reduced to dinitrogen tetroxide and water. In another embodiment, the dinitrogen tetroxide is distilled off as it is produced and the remaining residual mixture comprising unreacted mixture of nitric acid and acetic acid, water and excess acetic acid is recycled to the initial distillation. In still another embodiment of the invention, dinitrogen tetroxide, water and acetic acid are distilled off during the same distillation operation.

One specific detailed method of practicing the invention is set forth in the following non-limiting example.

*Example 1*

A mixture of nitric acid and acetic acid approaching that of the maximum boiling mixture, 34 mole percent nitric acid and 66 mole percent acetic acid was prepared by charging two moles (120 grams) of acetic acid and one mole (63 grams) of nitric acid to a reaction vessel. The mixture was heated and maintained at about 50° C. while approximately .283 mole (8.5 gram) of nitric oxide was bubbled therethrough over a period of about 30 minutes. The operation was arbitrarily limited so as to reduce only about half the nitric acid in the mixture. Much of the dinitrogen tetroxide (B.P. 21° C.) distilled off as it formed. Upon completion of the nitric oxide addition the temperature of the reaction mixture was raised to 104° C. for a few minutes and then the heating was terminated. The residue and distillates obtained were then analyzed. The following results were obtained.

| Charge (moles) | | Recovered (moles) | |
|---|---|---|---|
| | | residue | distillate |
| Acetic Acid | 2 | 1.95 | .05 |
| Nitric Acid | 1 | .468 | 0 |
| Dinitrogen tetroxide | 0 | .028 | .356 |
| Water | 0 | .248 | 0 |
| Nitric Oxide | .283 | 0 | .075 |

| | | mole/mole NO₂ produced | |
|---|---|---|---|
| | | Found | Expected |
| HNO₃ reduced | mole | .532 | .68 | .67 |
| NO used | do | .208 | .27 | .33 |
| H₂O produced | do | .248 | .32 | .33 |
| NO₂ produced | do | .769 | | |

The differences between the actual values and the theoretical arise from the approximate method used to measure the amount of nitric oxide used.

There are many known processes which produce either a mixture of nitric acid and acetic acid or a mixture of nitric acid, acetic acid, and water. For instance, a mixture of the latter composition is obtained in the low temperature reaction of isobutylene with liquid dinitrogen tetroxide which leads to the production of alpha hydroxyisobutyric acid and alpha nitratoisobutyric acid.

It is impossible to separate the mixture of nitric acid and acetic acid by distillation, since the bottoms from such a distillation will approach the composition of the maximum boiling mixture, 34 mole percent nitric acid and 66 mole percent acetic acid. Solvent extraction is unattractive because of the solubility of nitric acid in most solvents. Salt formation is also unattractive because of the ability of both acids to produce salts. The present method basically involves distilling off any excess nitric acid or acetic acid or both and water, if present, to obtain a mixture comprising essentially of nitric acid and acetic acid as bottoms. This mixture can approximate or be a constant boiling mixture of nitric and acetic acids. Such a mixture can be obtained substantially free of water, despite the nitric acid-water constant boiling mixture which ordinarily restricts the degree to which nitric acid can be dehydrated by distillation in the absence of acetic acid. The nitric acid-acetic acid mixture is then treated with nitric oxide to convert the major portion of the nitric acid to dinitrogen tetroxide which can be removed by distillation and recovered. The excess acetic acid is then distilled from the residue leaving only about twenty-five percent of the original nitric-acetic mixture, which can be recycled. The net result is the separation of the nitric acid-acetic acid mixture into acetic acid and dinitrogen tetroxide.

The above reduction of nitric acid with nitric oxide proceeds as follows:

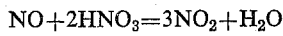

$$NO + 2HNO_3 = 3NO_2 + H_2O$$

At high water concentrations, the above reaction will favor the formation of nitric acid and nitric oxide. However, at low water concentrations nitric acid will react with nitric oxide to form dinitrogen tetroxide and water. Equilibrium studies have shown that this latter reaction will proceed until the mole ratio of water to nitric acid builds up to about 1.5. Thus, a nitric acid-acetic acid mixture, especially the maximum of constant boiling mixture can be reacted with nitric oxide to produce dinitrogen tetroxide until about 75 percent of the nitric acid is reduced. Seventy-five percent of the acetic acid can then be distilled off and recovered along with the water produced, leaving a residue containing about twenty-five percent of the original nitric acid-acetic acid mixture. Since the above desired reaction will proceed until a certain ratio of water to nitric acid is obtained, then it is possible to employ nitric acid-acetic acid mixtures containing appreciable amounts of water.

Referring now to the drawing, there is illustrated a flow sheet which embodies one method of practicing the present invention. In the flow sheet, there is shown a suitable distillation apparatus 10 into which is fed a mixture of nitric acid, acetic acid and water. This feed can be comprised of a fresh feed stream of the mixture plus recycled water, nitric acid and acetic acid. The distillation apparatus is maintained at a temperature sufficient to distill off excess nitric acid or acetic acid or both and water so as to obtain the constant boiling mixture of nitric and acetic acids as bottoms.

The overhead products of apparatus 10 are separated and recovered by conventional means (not shown), the bottoms in this case are illustrated as comprising a constant boiling mixture of about 34 mole percent nitric acid and 66 mole percent acetic acid are withdrawn from the distillation apparatus 10 and fed into reactor 12, suitably heated by heater 14. The constant boiling mixture is preferably fed near one end of reactor 12 while the preferred quantities of nitric oxide are fed at the opposite end so as to provide for counter-current operations. The reactor 12 is preferably operated at atmospheric pressure and at temperatures above 21° C. so as to distill off the dinitrogen tetroxide as it is produced. The dinitrogen tetroxide is recovered by conventional techniques. The residue leaving the reactor 12 comprises acetic acid, water and nitric acid, which is recycled to the distillation apparatus wherein the water and excess acetic acid are distilled off.

The above method can be varied considerably without departing from the scope of the invention. For instance, the separation can be carried out batchwise in one vessel as illustrated in the example. Also, the reactor 12 can be maintained at a sufficiently high temperature e.g., 118° C., so that the water produced and excess acetic acid can be distilled off in addition to the dinitrogen tetroxide. In this case, the recycle will be the unreacted portion of the nitric acid-acetic acid mixture. The reactor 12 can also be maintained at a temperature below 21° C. so that the dinitrogen tetroxide produced is retained in the mixture which is recycled to distillation apparatus 10. In this operation the dinitrogen tetroxide, water, excess nitric or acetic acids or both are removed by utilizing but one distillation operation.

Although the distillation apparatus and reactor are preferably operated at atmospheric pressure reduced pressures and superatmospheric pressures can also be employed. The temperatures employed in the distillation apparatus are those required to vaporize and distill off water, nitric acid and acetic acid. The temperatures employed for the reaction involving the reduction of nitric acid with nitric oxide are not critical and can be varied considerably. However, it is preferable to maintain the reactor, which is preferably suitable for counter-current operations, at a temperature above 21° C., the boiling point of dinitrogen tetroxide, so that it is distilled off as it is produced.

The quantity of nitric oxide to be contacted with the nitric acid-acetic acid mixtures e.g. the constant boiling mixture thereof can be varied depending on the degree of nitric acid reduction desired. It is, however, preferred that sufficient nitric oxide be employed to reduce at least from one half to about seventy-five percent of the nitric acid present in the mixture contacted therewith.

With regard to the use of dinitrogen tetroxide, it should be noted that dinitrogen tetroxide is an equilibrium mixture of the monomer ($NO_2$) and the dimer ($N_2O_4$). The equilibrium is a function of temperature. When used in the specification and claims, the expression "dinitrogen tetroxide" is intended to include the equilibrium concentration of the monomer at the temperature employed.

Since certain changes may be made in the above method without departing from the scope of the invention herein involved, it is intended that all matter contained in the above description and drawing shall be interpreted as illustrative and not in a limiting sense.

What is claimed is:

1. A method of recovering the nitrogen values and separating acetic acid from a mixture of nitric and acetic acids, which method comprises treating said mixture of nitric and acetic acids with sufficient nitric oxide to reduce a major portion of the nitric acid to dinitrogen tetroxide, distilling the resulting dinitrogen tetroxide from the mixture, and subsequently distilling acetic acid and water from the residue.

2. A method of recovering the nitrogen values and separating acetic acid from aqueous mixtures of nitric and acetic acids, which method comprises distilling a mixture of water, nitric acid and acetic acid to form a bottom fraction comprising a mixture of nitric acid and acetic acid and overhead fractions of any excess acetic acid and water, recovering said overhead acids, treating said mixture with sufficient nitric oxide to reduce the major portion of the nitric acid to dinitrogen tetroxide and water, distilling off dinitrogen tetroxide, water and acetic acid, and recovering the dinitrogen tetroxide and acetic acid.

3. The method of claim 2 wherein said bottom fraction comprises a constant boiling mixture of nitric acid and acetic acid.

4. A method of recovering the nitrogen values and separating acetic acid from an anhydrous mixture of nitric and acetic acids, which comprises treating a substantially anhydrous mixture of nitric acid and acetic acid with sufficient nitric oxide to reduce a major portion of the nitric acid to dinitrogen tetroxide and water, distilling off dinitrogen tetroxide, water and acetic acid, and recovering the dinitrogen tetroxide and acetic acid.

5. A method of recovering the nitrogen values and separating acetic acid from an aqueous mixture of nitric and acetic acids, which comprises distilling a mixture of water and nitric and acetic acids to form a bottoms composition consisting essentially of a constant-maximumboiling mixture of nitric and acetic acids and an overhead fraction of water and any excess acetic acid, treating the constant-maximum-boiling mixture with sufficient nitric oxide to reduce a major portion of the nitric acid to dinitrogen tetroxide and water, and distilling the dinitrogen tetroxide from said mixture.

6. The method of claim 5 wherein said mixture is treated with sufficient nitric oxide to reduce about 75 percent of the nitric acid therein.

7. A method of recovering the nitrogen values and separating acetic acid from aqueous mixtures of nitric and acetic acids which comprises feeding a mixture of water, nitric acid and acetic acid into a distillation vessel, withdrawing from the bottom of said distillation vessel a mixture of nitric acid and acetic acid, removing overhead fractions of acetic acid and water, introducing the bottom mixture into the upper portion of a column maintained at a temperature above about 21° C., introducing nitric oxide into the lower portion of said column to provide countercurrent flows, distilling off and recovering the dinitrogen tetroxide as it is formed, and recycling the resultant residue to said distillation vessel.

8. A method of recovering the nitrogen values and separating acetic acid from mixtures of nitric and acetic acids which comprises treating a substantially anhydrous mixture of nitric acid and acetic acid with nitric oxide until a major portion of the nitric acid is reduced to dinitrogen tetroxide and water, distilling off dinitrogen tetroxide, water and acetic acid, recycling the resultant residue for further reaction with said nitric oxide, and recovering the dinitrogen tetroxide and acetic acid.

9. In the method of recovering nitrogen values from a mixture of nitric acid, water and acetic acid the improvement which comprises removing substantially all of the water from the mixture, treating the substantially anhydrous mixture of nitric acid and acetic acid with nitric oxide until a major portion of the nitric acid is reduced to dinitrogen tetroxide and recovering the dinitrogen tetroxide.

10. The method of dehydrating nitric acid in mixtures of nitric acid, acetic acid and water which comprises distilling said mixture to form a bottom fraction comprising a mixture of nitric acid and acetic acid and an overhead fraction comprising excess acetic acid with water, and recovering said bottom fraction as a substantially anhydrous azeotropic mixture of nitric acid and acetic acid.

References Cited in the file of this patent

UNITED STATES PATENTS

| | | |
|---|---|---|
| 1,590,043 | Lentz | June 22, 1926 |
| 1,904,160 | Merley et al. | Apr. 18, 1933 |
| 1,948,968 | Kramer | Feb. 27, 1934 |
| 1,991,084 | Dreyfus | Feb. 12, 1935 |
| 2,543,446 | Egly | Feb. 27, 1951 |

FOREIGN PATENTS

| | | |
|---|---|---|
| 447,952 | Great Britain | May 28, 1936 |